E. K. BAKER.
DEMOUNTABLE RIM.
APPLICATION FILED MAR. 25, 1916.
1,314,932.
Patented Sept. 2, 1919.
2 SHEETS—SHEET 1.
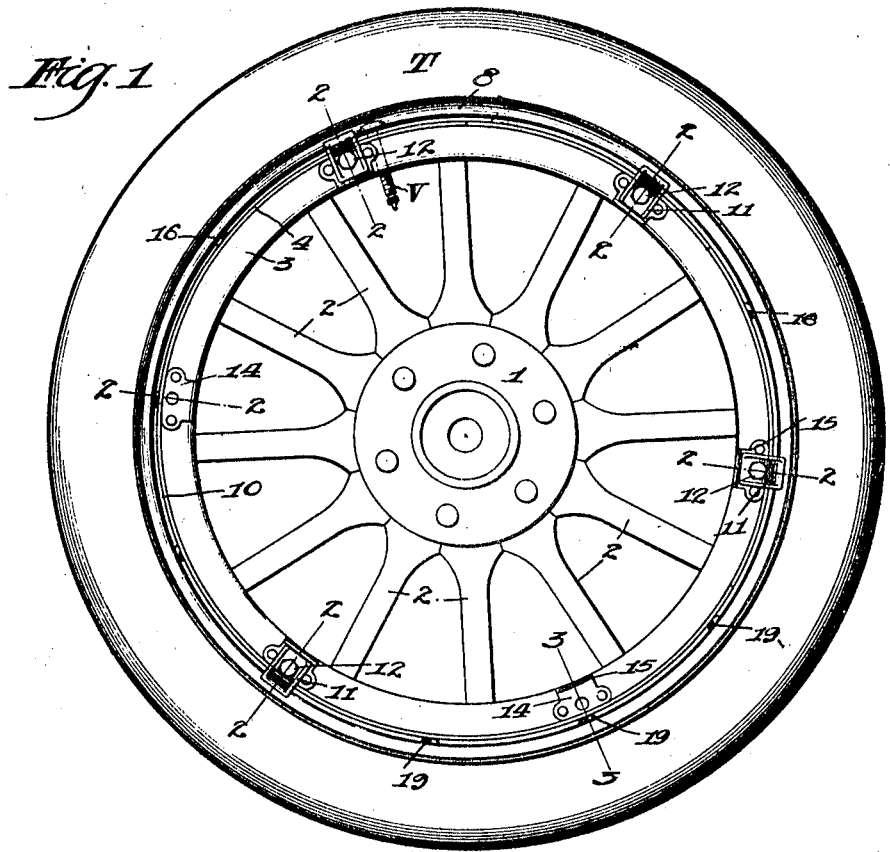
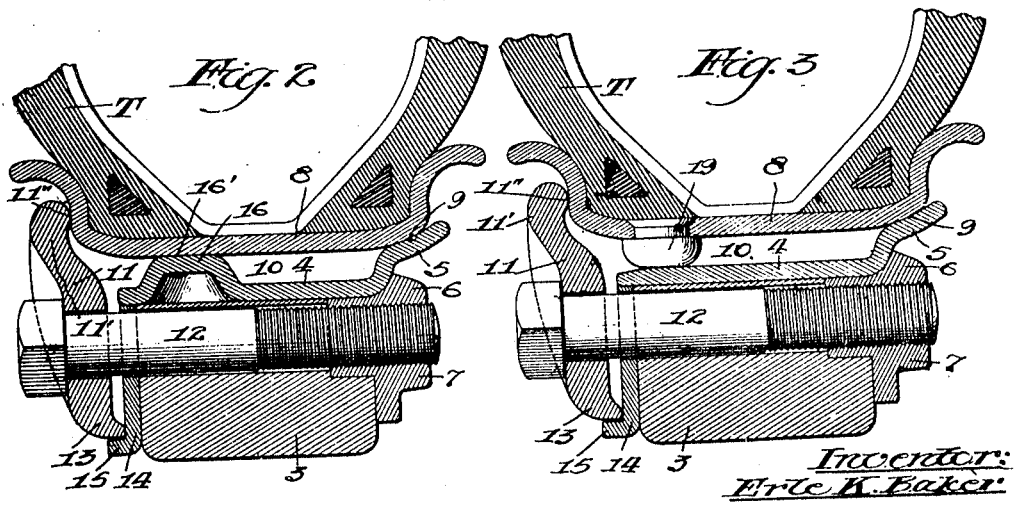
Witness:
Carl E. Horn.
Inventor:
Eric K. Baker

E. K. BAKER.
DEMOUNTABLE RIM.
APPLICATION FILED MAR. 25, 1916.

1,314,932.

Patented Sept. 2, 1919.
2 SHEETS—SHEET 2.

Inventor:
Erie K. Baker

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE RIM.

1,314,932.

Specification of Letters Patent.

Patented Sept. 2, 1919.

Application filed March 25, 1916. Serial No. 86,597.

*To all whom it may concern:*

Be it known that I, ERLE KING BAKER, a citizen of the United States, and residing at Chicago, Cook county, Illinois, have invented certain new and useful Improvements in Demountable Rims, of which the following is a specification.

My invention relates to improvements in automobile wheels and demountable tire-carrying rims therefor. The primary object of my invention is to improve and simplify the construction and operation of such wheels and rims and to lessen the cost thereof. A further object of my invention is to provide a construction by which the demountable rim shall be adapted to be buttoned on to the wheel in the usual manner and still be firmly supported and secured thereon without resort to the use of members which act as wedges between the rim and wheel and which inevitably warp and distort the rim to an extent which is perceptible in the wear of the tire.

Figure 4:
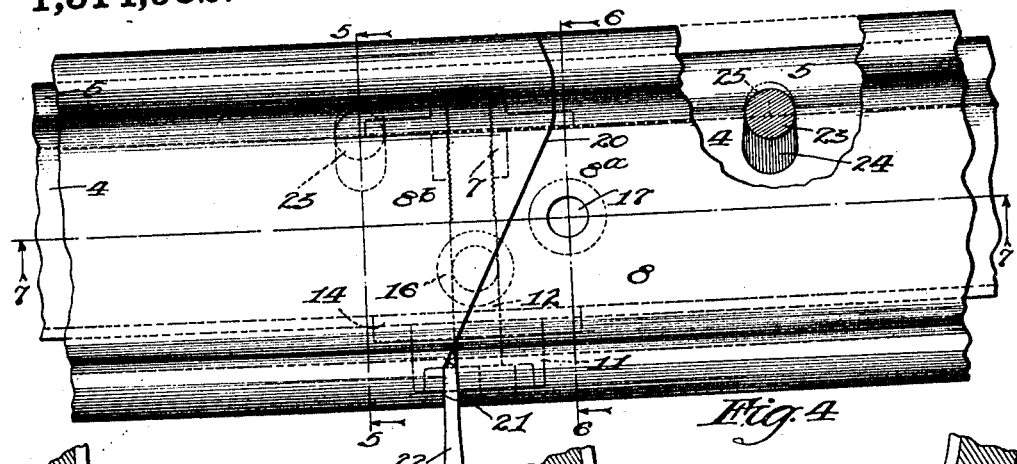
Figures 5, 6:
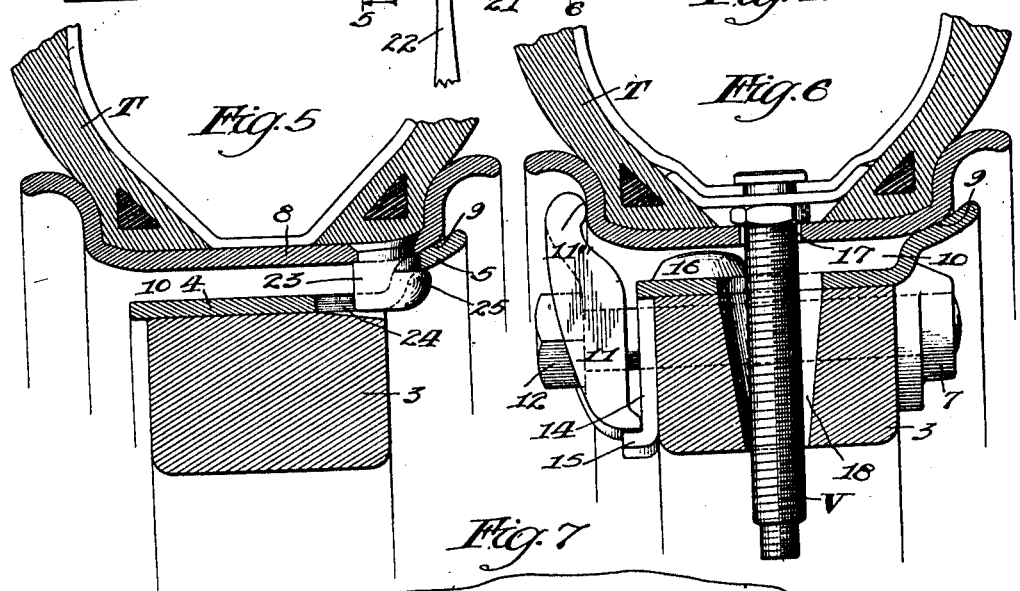
Figure 7:
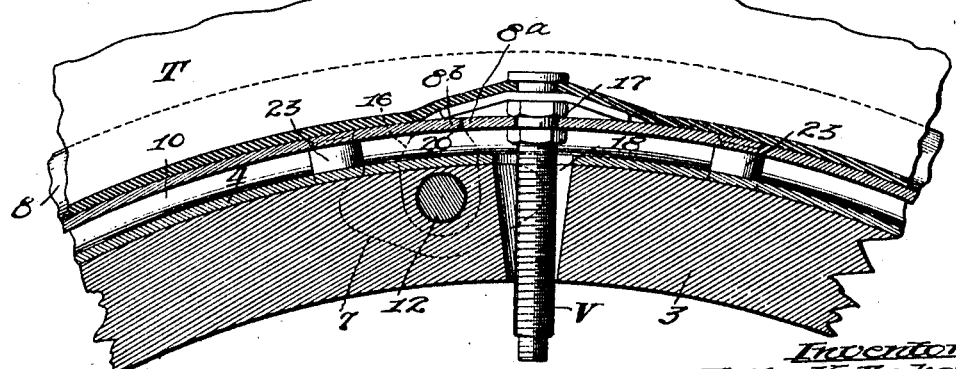

The general nature of my invention and also the details of the best embodiment thereof which I have thus far devised will be readily understood on reference to the drawings that form part of this specification, and in which: Figure 1 is a side elevation of a motor vehicle wheel fully equipped in accordance with my invention;—Fig. 2 is a full sized cross section on any of the lines 2—2 of Fig. 1;—Fig. 3 is a similar section on the line 3—3 of Fig. 1;—Fig. 4 is a plan view of the portions of the rim and wheel felly which are adjacent the valve stem location, the tire being omitted;—Fig. 5 is a cross section on the line 5—5 of Fig. 4;—Fig. 6 is a cross section on the line 6—6 of Fig. 4;—and Fig. 7 is a vertical circumferential section on the line 7—7 of Fig. 4.

As shown in the drawings, 1 represents the wheel hub;—2, the radial spokes;—3 the wooden felly;—and, 4 the endless metal felly band or fixed rim within which the felly and spokes are compressed. The fixed rim, 4, is provided with a raised conical flange, 5, which overhangs the inner side of the felly. Said fixed rim is secured in any suitable way, as by the usual tire bolts (not shown) and by the shoulders, 6, of the nuts, 7, on the felly.

The demountable rim, 8, may be of any desired cross section according to the cross section of the tire to be used thereon. In the drawings I have shown a rim of the now conventional integrally-flanged straight-side "Baker" type. The demountable rim is of greater circumference than the fixed rim, 4, and its innermost edge presents a conical surface, 9, which fits the flange, 5, of the fixed rim. An annular space, 10, remains between the two rims.

To secure the demountable rim upon the fixed rim, I thrust the demountable rim axially against the flange, 5, of the fixed rim, as well shown in Figs. 2, 3, 5 and 6. For this purpose I provide pressure plates, 11, attached to the outer side of the wheel felly by operating bolts, 12. As shown, the latter may be of the type which present their heads outwardly and have their threaded ends held in the shouldered nuts, 7. These pressure plates are substantially rectangular in form and each thereof is characterized by an outer end, 11′, which presents a rounded edge, 11″, to the outer flange of the demountable rim. The inner end, 13, of the pressure plate, 11, turns toward the wheel felly, and to prevent its marring the wooden felly there is a metal washer, 14, on the latter. The end, 15, of the washer, 14, provides a step which prevents pressure plate from annoyingly twisting on its bolt when the bolt is rotated to fasten or loosen the pressure plate, 11. As shown in Fig. 1, I prefer that there shall be six bolts, 12, and six pressure plates 11.

In many cases, and particularly when the rim is of the endless standard clencher type, the engagement of the demountable rim upon the single line of conical contact afforded by the back-flange, 5, provides a support which is adequate without the assistance of other parts or contacts. But even in such cases and practically always in the case of transplit demountable rims I find it both necessary and desirable to center the demountable rim upon the fixed rim preparatory to pressing the demountable rim axially upon the back-flange, 5, of the fixed rim; otherwise the perpendicularity of the rim to the wheel axis is not insured. For this purpose I provide centering studs between the two rims. These perform some of the functions of the similar studs described in my Patent No. 1,095,953. The structures, however, differ in several important particulars, due to the fact that in the present structure the studs are utilized as auxiliary supports for the rim and are not required to correct that distortion of the rim mentioned in said patent and caused by the former association of wedge lugs therewith.

The studs which I employ in the present case are of two kinds. The greater number thereof are fixed on and project outwardly from the fixed rim, 4, near the outer edge thereof. The lesser number are provided on the inner periphery of the demountable rim (near the outer edge thereof) and in a group diametrically opposite the valve stem hole in the demountable rim.

Of the first mentioned studs there are preferably nine, where six pressure plates are used. These studs are marked, 16, and, as shown in Fig. 2, are preferably made by striking up portions of the metal composing the fixed rim. The outer ends or tops, 16', of these studs are preferably substantially flat; the studs being truncated cones. They are of such height as to support the rim in cross sectionally parallel position with respect to the fixed rim, 4; though they may be somewhat lower when the diameter of the wheel is large. I prefer that there shall be one such stud, 16, back of each pressure plate. The other studs, 16, are preferably arranged midway between the pressure plate positions.

The tire, T, has a valve stem, V, which extends through a hole, 17, in the rim and through a hole, 18, in the fixed rim and felly. As usual, the valve stem marks the pivoting or hinging point of the demountable rim; in other words, the point on which the rim swings with respect to the wheel during the operation of the buttoning-on and unbuttoning the rim.

Diametrically opposite the valve stem hole, 17, I provide the demountable rim with one or more fixed studs, 19, of the second kind mentioned. These studs, 19, may be round headed rivets applied to the inner periphery of the rim, 8, as best shown in Fig. 3. The omission of studs, 16, upon the part of the fixed rim which is diametrically opposite the valve stem affords the clearance which is necessary to allow the rim to button into position on the wheel; on the other hand, when the rim is thus positioned the studs, 19, of which there are preferably three, as shown, button into place on the periphery of the fixed rim, 4, and therefore aid in centering the rim on the wheel and also support that part of the rim in parallelism with the fixed rim, in the manner before explained as to the stud, 16.

To adapt this form of support to transmit demountable rims I make two important changes in the former construction of such rims. The first consists in providing means for positively and non-adjustably, but detachably, tying together the rim ends upon a circumferential line which substantially conforms to the innermost or rear flange of the demountable rim. By so doing, the rim is held against expansion by the thrust of the rim against the conical flange, 5, and at the same time the outer edge of the rim is left free to be contracted by the force of the pneumatic tire. Such compression and contraction results in forcibly and securely seating the demountable rim upon the centering and supporting studs. Likewise, the outer edge of the rim is left free to be expanded, as by a tool inserted in the outer end of the split in the rim, an operation which facilitates the unbottoning of the rim when the tire is deflated. The second important change consists in transversely slotting the fixed rim in such manner that the rim-end connecting and driving studs need not at first be fully engaged with the fixed rim. This results in allowing the valve stem portion of the rim to be held outwardly until the opposite side of the rim has been buttoned over the wheel after which said valve stem portion may be forced inwardly against the back-flange, which action causes said studs to fully engage with the fixed rim. My purpose, in this, is to allow the rim to button on with less clearance over the fixed rim.

These portions of the structure are best shown in Figs. 4, 5, and 6; wherein 20 represents a compromise diagonal transverse cut or split by which the rim ends, $8^a$ and $8^b$, are made self-alining. This self-alining feature of the rim is not specifically claimed in this application, but is both shown and described in my companion application of even date herewith, to-wit, Serial No. 86,598. The diagonal split shown in Fig. 4 further differs from others in the provision of a constantly open notch, 21, in the outer edge of the rim, 8, between the ends of the rim. I prefer that the side walls of the notch, 21, shall be made by perpendicular cuts in the edge of the rim, 8. Thus formed, the notch readily admits the wedge point, 22, of a screw driver or like tool, by means of which the ends of the rim may be pried apart to expand or circumferentially distend the outer flange of the rim, 8, for the purpose above mentioned. The valve stem hole, 17, is positioned close to the split, 20, and on each side thereof, i. e., on each rim-end, $8^a$, $8^b$, I provide a rim-end-connecting-and-driving stud, 23. These two studs are most conveniently shouldered against the inner periphery of the rim and are riveted in the body portion thereof, as shown in Fig. 5. The fixed rim, 4, contains corresponding slots, 24, positioned to receive the two driving studs, 23, 23. I prefer that the slots shall be transversely elongated and partly formed in the outstanding flange, 5, of the rim. Upon each stud I form a hook-shaped end or shoulder, 25, adapted to hook under the overhanging part of the flange, 5, when the demountable rim is fully positioned on the wheel. The slots, 24, are of such transverse length that the end connecting and driving studs, 23, may be dropped into the same before the edge of the demountable rim engages the back-flange, 5. The valve stem yields in the rim sufficiently to allow this action when it is first dropped into the valve stem hole, 18, in the felly. After the opposite side of the rim has been buttoned over the wheel, the rim as a whole is pushed axially thereon and thus the hooks, 25, of the studs, 23, are engaged with the fixed rim (see Fig. 5). When thus engaged the studs and the fixed rim jointly tie the rim ends together and to the fixed rim, substantially in the plane of the inner flange of the demountable rim. Obviously the studs prevent circumferential movement of the demountable rim on the wheel and obviously the hooks upon the studs also prevent radial movement or distention of the rim-ends with respect to the body of the wheel. Therefore, when once positioned on the fixed rim the demountable rim is securely held against either disalinement thereon or dislodgment therefrom until the demountable rim is intentionally unbuttoned from the wheel.

By preference, I arrange one of the pressure plates, 11, so that it overlaps the split in the rim, thus further supporting the rim ends, 8ᵃ, and 8ᵇ. As shown by dotted lines in Fig. 4, one of the centering and supporting studs, 16, is arranged directly beneath the split in the rim to additionally support the rim ends.

In most cases the demountable transplit rim may be buttoned and unbuttoned on the wheel without any attention being given to the circumference of the outer edge of the rim, but, whenever the operation is found to be too difficult the difficulty can quickly be remedied by expanding the outer flange of the rim, as by means of the tool, 22, placed in the notch, 21.

As various modifications of my invention will readily suggest themselves to one who is skilled in the art, I do not limit or confine the invention to the precise construction herein shown and described, except as specifically set forth in the appended claims.

Having thus described my invention, I claim as new and desire to secure by Letters Patent:—

1. A motor vehicle wheel having a substantially conical back-flange, in combination with an integrally flanged transplit demountable rim of greater diameter than the wheel and formed for single line conical contact with said back-flange thereof, means tying the rim-ends together and to the wheel substantially in the plane of the inner side flange of the rim, and a plurality of pressure plates and bolts on the outer side of the wheel, adapted to exert axial pressure against the outer side flange of said rim and to hold the inner side thereof on said back-flange.

2. A motor vehicle wheel having a substantially conical back-flange, in combination with an integrally flanged transplit demountable rim of greater diameter than the wheel and formed for single line conical contact with said back-flange thereof, a plurality of pressure plates and bolts therefor on the outer side of the wheel, for engagement with the outer flange of said rim, and fixed rim centering-and-supporting studs circumferentially spaced in the annular opening between the wheel and rim and adjacent the outer edge of the wheel.

3. A motor vehicle wheel having a fixed rim formed with a back-flange and provided with a valve stem hole, in combination with an integrally flanged transplit demountable rim of greater diameter than the wheel and having its inner edge engaged with said back-flange thereof, axial pressure means on the outer side of the wheel and pressing against the outer flange of said demountable rim, a plurality of centering and supporting studs circumferentially spaced on said fixed rim near the outer edge thereof, and a plurality of similar studs on said demountable rim and engaged with said fixed rim at points diametrically opposite the valve stem hole therein.

4. A motor vehicle wheel having a substantially conical back-flange, in combination with an integrally flanged transplit demountable rim of greater diameter than the wheel and formed for single line of conical contact with said back-flange thereof, means tying the rim-ends together and to the wheel substantially in the plane of the inner side flange of the rim, a plurality of pressure plates and bolts therefor on the outer side of the wheel, adapted to exert axial pressure against the outer side flange of said rim, and fixed rim-centering-and-supporting studs circumferentially spaced in the annular space between the wheel and rim.

5. A motor vehicle wheel having a substantially conical back-flange and a valve-stem hole, in combination with an integrally flanged transplit demountable rim of greater diameter than the wheel and formed for single line conical contact with said back-flange thereof, means tying the rim ends together and to the wheel substantially in the plane of the inner side flange of the rim, a plurality of pressure plates and bolts on the outer side of the wheel, adapted to exert axial pressure against the outer side flange of said rim, rim-centering-and-supporting studs circumferentially spaced and fixed on the inner periphery of said rim opposite the valve stem position and similar studs circumferentially spaced and fixed on the periphery of the wheel on each side of the valve stem hole therein, substantially as and for the purpose specified.

6. A motor-vehicle-wheel fixed rim, or felly band, having a circumferential and substantially conical back-flange and provided with a valve stem hole and with transversely elongated driving stud holes, the latter being positioned on opposite sides of said valve stem hole, and extending into but not through said back-flange, substantially as and for the purpose specified.

7. A motor-vehicle-wheel fixed rim or felly band having a circumferential and substantially conical back-flange and provided with a valve stem hole and with two driving stud holes, the latter being positioned at opposite sides of said valve stem hole, but nearer to said back flange than to the front edge of said felly band, substantially as and for the purpose specified.

In testimony whereof I have hereunto set my hand this 18th day of March, 1916.

ERLE KING BAKER.